(12) United States Patent
Goeringer et al.

(10) Patent No.: US 12,301,455 B2
(45) Date of Patent: *May 13, 2025

(54) SYSTEMS AND METHODS FOR SECURE NETWORK MANAGEMENT OF VIRTUAL NETWORK FUNCTION

(71) Applicant: CABLE TELEVISION LABORATORIES, INC., Louisville, CO (US)

(72) Inventors: Steven J. Goeringer, Westminister, CO (US); Igor Faynberg, East Brunswick, NJ (US); Donald E. A. Clarke, Joplin, MO (US)

(73) Assignee: Cable Television Laboratory, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,563

(22) Filed: Nov. 17, 2023

(65) Prior Publication Data

US 2024/0089201 A1   Mar. 14, 2024

Related U.S. Application Data

(63) Continuation of application No. 18/157,451, filed on Jan. 20, 2023, now Pat. No. 11,855,890, which is a
(Continued)

(51) Int. Cl.
*H04L 45/586* (2022.01)
*G06F 9/455* (2018.01)
(Continued)

(52) U.S. Cl.
CPC ........ *H04L 45/586* (2013.01); *G06F 9/45558* (2013.01); *H04L 45/02* (2013.01); *H04L 45/42* (2013.01); *G06F 2009/45595* (2013.01)

(58) Field of Classification Search
CPC ....... H04L 45/586; H04L 45/02; H04L 45/42; G06F 9/45558; G06F 2009/45595; G06F 9/5077
(Continued)

(56) References Cited

U.S. PATENT DOCUMENTS

| | | |
|---|---|---|
| 6,728,780 B1 | 4/2004 | Hebert |
| 7,411,973 B2 | 8/2008 | Mcdaniel et al. |

(Continued)

FOREIGN PATENT DOCUMENTS

| | | | | |
|---|---|---|---|---|
| CN | 108259216 A | * | 7/2018 | ........... G06F 21/552 |
| CN | 110278101 A | | 9/2019 | |

(Continued)

*Primary Examiner* — Zi Ye
*Assistant Examiner* — Berhanu Shitayewoldetadik
(74) *Attorney, Agent, or Firm* — Armstrong Teasdale LLP (57) ABSTRACT

A virtual network system for a computer network is provided. The system includes a first host executing a virtual network function manager. The system also includes a second host executing a management virtual machine. The management virtual machine is in communication with the virtual network function manager and with one or more virtual network function component instantiations. The management virtual machine is programmed to route messages between the one or more virtual network function component instantiations and the virtual network function manager.

20 Claims, 4 Drawing Sheets

Related U.S. Application Data continuation of application No. 17/162,812, filed on Jan. 29, 2021, now Pat. No. 11,563,677, which is a continuation-in-part of application No. 16/457,278, filed on Jun. 28, 2019, now Pat. No. 11,822,946.

(60) Provisional application No. 62/967,126, filed on Jan. 29, 2020, provisional application No. 62/691,259, filed on Jun. 28, 2018.

(51) Int. Cl.
  *G06F 15/16* (2006.01)
  *H04L 15/16* (2006.01)
  *H04L 45/02* (2022.01)
  *H04L 45/42* (2022.01)

(58) Field of Classification Search
  USPC .................................................. 709/238
  See application file for complete search history.

(56) References Cited

U.S. PATENT DOCUMENTS

| | | | |
|---|---|---|---|
| 8,250,641 B2 | 8/2012 | Morgan et al. | |
| 8,370,834 B2 | 2/2013 | Edwards et al. | |
| 9,183,028 B1 | 11/2015 | Brandwine et al. | |
| 9,256,393 B2 | 2/2016 | Ivashin et al. | |
| 9,397,944 B1 * | 7/2016 | Hobbs | H04L 47/522 |
| 10,205,698 B1 | 2/2019 | Petersen et al. | |
| 10,469,317 B1 * | 11/2019 | Jiang | H04L 41/082 |
| 10,545,778 B1 | 1/2020 | Venkata | |
| 10,601,909 B2 | 3/2020 | Brandwine et al. | |
| 10,644,933 B2 | 5/2020 | Cohn et al. | |
| 10,678,592 B2 | 6/2020 | Enomoto et al. | |
| 10,693,801 B2 | 6/2020 | Tsirkin | |
| 10,756,990 B1 | 8/2020 | Vidyadharan et al. | |
| 10,764,115 B1 | 9/2020 | Melkild | |
| 10,764,118 B1 * | 9/2020 | Melkild | H04L 41/0654 |
| 10,826,723 B1 | 11/2020 | Strauss et al. | |
| 10,904,268 B2 | 1/2021 | Brandwine et al. | |
| 11,082,298 B2 | 8/2021 | Wang et al. | |
| 11,115,317 B1 | 9/2021 | Melkild | |
| 11,196,616 B1 | 12/2021 | Melkild | |
| 11,533,271 B2 | 12/2022 | Bernat et al. | |
| 2003/0058274 A1 | 3/2003 | Hill et al. | |
| 2004/0179546 A1 | 9/2004 | McDaniel et al. | |
| 2006/0010238 A1 | 1/2006 | Craft et al. | |
| 2006/0087940 A1 | 4/2006 | Brewer et al. | |
| 2009/0119684 A1 | 5/2009 | Mahalingam et al. | |
| 2010/0107162 A1 | 4/2010 | Edwards et al. | |
| 2012/0017031 A1 | 1/2012 | Mashtizadeh et al. | |
| 2012/0102190 A1 | 4/2012 | Durham et al. | |
| 2013/0024855 A1 | 1/2013 | North | |
| 2013/0047151 A1 | 2/2013 | Sridharan et al. | |
| 2013/0159535 A1 | 6/2013 | Zhang et al. | |
| 2014/0052864 A1 | 2/2014 | Linden et al. | |
| 2014/0223179 A1 * | 8/2014 | Wang | G06F 21/83 |
| | | | 713/168 |
| 2015/0033224 A1 | 1/2015 | Maheshwari et al. | |
| 2015/0317169 A1 * | 11/2015 | Sinha | G06F 9/4416 |
| | | | 713/2 |
| 2015/0326542 A1 | 11/2015 | Serebrin et al. | |
| 2015/0378760 A1 * | 12/2015 | Su | G06F 9/45558 |
| | | | 718/1 |
| 2016/0055019 A1 | 2/2016 | Thakkar et al. | |
| 2016/0057005 A1 | 2/2016 | Thakkar et al. | |
| 2016/0057006 A1 | 2/2016 | Thakkar et al. | |
| 2016/0080317 A1 | 3/2016 | Brandwine et al. | |
| 2016/0099860 A1 | 4/2016 | Huang et al. | |
| 2016/0132347 A1 | 5/2016 | Brandwine et al. | |
| 2016/0191545 A1 | 6/2016 | Nanda et al. | |
| 2016/0226834 A1 | 8/2016 | Dawson | |
| 2016/0248626 A1 | 8/2016 | Vernia et al. | |
| 2016/0364252 A1 * | 12/2016 | Graf | G06F 9/4416 |
| 2017/0017512 A1 * | 1/2017 | Csatari | G06F 9/45558 |
| 2017/0063801 A1 | 3/2017 | Faynberg et al. | |
| 2017/0078216 A1 * | 3/2017 | Adolph | H04L 41/0895 |
| 2017/0104679 A1 * | 4/2017 | Sunavala | H04L 45/306 |
| 2017/0147374 A1 | 5/2017 | Tsirkin et al. | |
| 2017/0147378 A1 | 5/2017 | Tsirkin et al. | |
| 2017/0149729 A1 | 5/2017 | Tsirkin | |
| 2017/0180325 A1 | 6/2017 | Palermo et al. | |
| 2017/0212784 A1 | 7/2017 | Johnsen et al. | |
| 2017/0324612 A1 | 11/2017 | Perez et al. | |
| 2018/0004539 A1 | 1/2018 | Liguori et al. | |
| 2018/0013674 A1 | 1/2018 | Nainar et al. | |
| 2018/0052701 A1 | 2/2018 | Kaplan et al. | |
| 2018/0052702 A1 | 2/2018 | Kaplan et al. | |
| 2018/0060105 A1 | 3/2018 | Shimizu | |
| 2018/0095774 A1 | 4/2018 | Atta et al. | |
| 2018/0115519 A1 | 4/2018 | Bonomi et al. | |
| 2018/0124171 A1 | 5/2018 | Han et al. | |
| 2018/0302343 A1 | 10/2018 | Lokman et al. | |
| 2018/0352007 A1 | 12/2018 | Caldwell et al. | |
| 2019/0014157 A1 | 1/2019 | Caldwell et al. | |
| 2019/0041824 A1 | 2/2019 | Chavez et al. | |
| 2019/0081891 A1 | 3/2019 | Mundkur et al. | |
| 2019/0158396 A1 * | 5/2019 | Yu | H04L 45/745 |
| 2019/0215243 A1 | 7/2019 | Wang et al. | |
| 2019/0235898 A1 | 8/2019 | Koehler et al. | |
| 2019/0260685 A1 | 8/2019 | Tsirkin | |
| 2019/0280971 A1 * | 9/2019 | Yu | H04L 12/4641 |
| 2019/0294446 A1 | 9/2019 | Liguori et al. | |
| 2019/0311123 A1 * | 10/2019 | Lal | H04L 9/321 |
| 2019/0319896 A1 | 10/2019 | Guo et al. | |
| 2019/0334781 A1 * | 10/2019 | Caldwell | H04L 41/12 |
| 2020/0076685 A1 | 3/2020 | Vaidya et al. | |
| 2020/0099775 A1 | 3/2020 | Brissette et al. | |
| 2020/0145419 A1 * | 5/2020 | Yitbarek | H04L 63/0853 |
| 2020/0293359 A1 | 9/2020 | Xia et al. | |
| 2020/0329076 A1 | 10/2020 | Caldwell et al. | |
| 2020/0364073 A1 | 11/2020 | Obara et al. | |
| 2020/0389469 A1 | 12/2020 | Litichever et al. | |
| 2021/0191784 A1 | 6/2021 | Rauschenbach et al. | |
| 2021/0232467 A1 | 7/2021 | Witt et al. | |
| 2021/0377166 A1 | 12/2021 | Brar et al. | |
| 2022/0329676 A1 | 10/2022 | Wouhaybi et al. | |
| 2022/0360653 A1 | 11/2022 | Wouhaybi et al. | |
| 2022/0385598 A1 | 12/2022 | Pismenny et al. | |

FOREIGN PATENT DOCUMENTS

| | | | |
|---|---|---|---|
| CN | 108259216 B | 9/2021 | |
| EP | 3343368 A1 | 7/2018 | |
| EP | 3576359 A4 | 1/2020 | |
| WO | WO-2009026028 A2 * | 2/2009 | .......... G06F 11/1458 |
| WO | 2010127365 A1 | 11/2010 | |
| WO | 2013064189 A1 | 5/2013 | |
| WO | 2015121750 A1 | 8/2015 | |
| WO | WO-2016026129 A1 * | 2/2016 | ............ G06F 21/53 |
| WO | WO-2016128062 A1 * | 8/2016 | ......... G06F 9/45558 |
| WO | 2016184283 A1 | 11/2016 | |
| WO | 2017012381 A1 | 1/2017 | |
| WO | 2017189015 A1 | 11/2017 | |
| WO | 2018049256 A1 | 3/2018 | |
| WO | 2018181840 A1 | 10/2018 | |

* cited by examiner

SYSTEMS AND METHODS FOR SECURE NETWORK MANAGEMENT OF VIRTUAL NETWORK FUNCTION

CROSS REFERENCE TO RELATED APPLICATIONS

This application is a continuation of and claims priority to U.S. patent application Ser. No. 18/157,451, filed Jan. 20, 2023, which claims the benefit of and priority to U.S. patent application Ser. No. 17/162,812, filed Jan. 29, 2021, which issued as U.S. Pat. No. 11,563,677 on Jan. 24, 2023, which claims the benefit of and priority to U.S. Provisional Patent Application Ser. No. 62/967,126, filed Jan. 29, 2020, and is also a continuation-in-part of U.S. patent application Ser. No. 16/457,278, filed Jun. 28, 2019, which claims the benefit of and priority to U.S. Provisional Patent Application Ser. No. 62/691,259, filed Jun. 28, 2018, which are incorporated herein by reference in their entirety.

BACKGROUND

The field of the disclosure relates generally to management of computer networks, and more particularly, to secure management of virtual network functions.

The European Telecommunication Standards Institute (ETSI) has generated the Management and Operations (MANO) architecture for Network Function Virtualization (NFV). This architecture is designed as a blueprint for developing products and further standards. However, the architecture as presented requires further architectural development to ensure implemental development.

One of the issues is the communication between the virtual network function manager (VNFM) and each virtual machine that implements virtualized network function component instantiation (VNFCI) as the original architecture. As presented, the architecture requires developing communication channels between the VNFM and the VNFCI. There are potential issues with this approach, including, but not limited to, scalability problems and loss of efficiency as the number of virtual machines grows. The presented architecture requires connectivity between the control plane of the NFV operator and the service plan of the tenants. This would increase the attack surface and enable denial-of-service attacks against the infrastructure. Accordingly, improvements to the architecture could provide improvements to the security and efficiency of these systems.

BRIEF SUMMARY

In an embodiment, a virtual network system for a computer network is provided. The system includes a first host executing a virtual network function manager. The system also includes a second host executing a management virtual machine. The management virtual machine is in communication with the virtual network function manager and with one or more virtual network function component instantiations. The management virtual machine is programmed to route messages between the one or more virtual network function component instantiations and the virtual network function manager.

In an additional embodiment, a method for providing virtual network functions is provided. The method is implemented by at least one processor in communication with at least one memory device. The method includes executing a management virtual machine for communicating with a remote host computing device over a first computer network. The method also includes executing a plurality of virtual network function component instantiations. The method further includes receiving status information about a first virtual network function component instantiation of the plurality of virtual network function component instantiations. In addition, the method includes transmitting the status information to the remote host computing device via the first computing network. Moreover, the method includes receiving a request from the remote host computing device via the first computing network. Furthermore, the method includes executing the request one the first virtual network function component instantiation.

In a further embodiment, a host computing device is provided. The host computing device includes at least one processor in communication with at least one memory device. The at least one processor is programmed to execute a management virtual machine for communicating with a remote host computing device over a first computer network. The at least one processor is also programmed to execute a plurality of virtual network function component instantiations. The at least one processor is further programmed to receive status information about a first virtual network function component instantiation of the plurality of virtual network function component instantiations. In addition, the at least one processor is programmed to transmit the status information to the remote host computing device via the first computing network. Moreover, the at least one processor is programmed to receive a request from the remote host computing device via the first computing network. Furthermore, the at least one processor is programmed to execute the request one the first virtual network function component instantiation.

In an additional embodiment, a virtual network system for a computer network id provided. The system includes a first host executing a virtual network function manager. The system also includes a second host executing a first virtual network function component instantiation. The first virtual network function component instantiation is in communication with the virtual network function manager and with one or more additional virtual network function component instantiations. The first virtual network function component instantiation is programmed to route messages between the one or more additional virtual network function component instantiations and the virtual network function manager.

In yet another embodiment, a method for providing virtual network functions is provided. The method is implemented by at least one processor in communication with at least one memory device. The method includes executing a designated virtual network function component instantiation for communicating with a remote host computing device over a first computer network. The method also includes executing a plurality of virtual network function component instantiations. The method further includes receiving status information about a first virtual network function component instantiation of the plurality of virtual network function component instantiations. In addition, the method includes transmitting the status information to the remote host computing device via the first computing network. Moreover, the method includes receiving a request from the remote host computing device via the first computing network. Furthermore, the method includes executing the request one the first virtual network function component instantiation.

In still a further embodiment, a host computing device is provided. The host computing device includes at least one processor in communication with at least one memory device. The at least one processor is programmed to execute a designated virtual network function component instantiation for communicating with a remote host computing device over a first computer network. The at least one processor is also programmed to execute a plurality of virtual network function component instantiations. The designated virtual network function component instantiation is separate from the plurality of virtual network function component instantiations. The at least one processor is further programmed to receive status information about a first virtual network function component instantiation of the plurality of virtual network function component instantiations. In addition, the at least one processor is programmed to transmit the status information to the remote host computing device via the first computing network. Moreover, the at least one processor is programmed to receive a request from the remote host computing device via the first computing network. Furthermore, the at least one processor is programmed to execute the request one the first virtual network function component instantiation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The embodiments described herein provide innovative systems and methods for computer networks within NFV environments. The present embodiments introduce, among other solutions, techniques for communication between virtual network functions (VNF) and virtual network function managers (VNFM) to ensure secure and efficient communication. The present embodiments are advantageously applicable in the ETSI NFV Management and Orchestration (MANO) environment and architecture.

Network Functions Virtualization (NFV) adds new capabilities to communications networks and requires anew set of management and orchestration functions to be added to the current model of operations, administration, maintenance and provisioning. In legacy networks, Network Function (NF) implementations are often tightly coupled with the infrastructure they run on. NFV decouples software implementations of Network Functions from the computation, storage, and networking resources they use. The virtualization insulates the Network Functions from those resources through a virtualization layer.

The decoupling exposes a new set of entities, the Virtualized Network Functions (VNFs), and a new set of relationships between them and the NFV Infrastructure (NFVI). VNFs can be chained with other VNFs and/or Physical Network Functions (PNFs) to realize a Network Service (NS).

The management and orchestration of virtualized resources are leveraged for providing VNFs with the resources they need. Resource allocation in the NFVI is a potentially complex task as a lot of requirements and constraints may need to be met simultaneously. Particularly requirements for network allocation add complexity compared to known resource allocation strategies for computing resources in virtualized environments. For example, some VNFs require low latency or high bandwidth links to other communication endpoints.

The systems and methods disclosed herein describe specific connections between the VNFs and the virtual network function manager (VNFM) to (i) improve security and (ii) increase efficiency. More specifically, the systems and methods describe completely separating the operator's infrastructure from the tenant's VNFs, such that they may even run on separate networks. This separation prevents the tenants from accessing the operator's infrastructure. The systems and methods disclosed herein also describe where the VNFM communicates only to one specialized virtual machine on the host, which is part of the NFV operator infrastructure. The VNFM is capable of learning the states of all of the virtualized network function component instantiations (VNFCI) without directly interacting with any VNFCI. With these states, the VNFM is capable of making control decisions and acting on all of the VNFCIs, again without direct interaction.

As described herein, the host hardware is equipped with two network interface cards (NIC), where each is associated with its own IP address. The first card is connected to a Command and Control Network. The Command and Control Network is only connected to management entities, such as the VNFM. The second card is connected to the overall hosting network, for hosting the application infrastructure. The virtual NICs of all of the VNFCIs are mapped onto the second NIC. The first NIC is used exclusively by the specialized management virtual machine (VM), such as Domaine0 in XEN hypervisors. In some embodiments, the specialized management VMs have access to the hypervisor administrative application programmer's interface (API).

In an alternative embodiment, another interface between the virtual network function manager (VNFM) process and a process on each virtual machine that implements virtualized network function component instantiation (VNFCI) can be limited to a single dedicated VNFCI that has the interface open. In this embodiment, the single VNFCI acts as the interface between the rest of the VNFCI and the VNFM. In at least one embodiment, the selected VNFCI is migrated from the host associated with the other VNFCI to the host of the command and control network. The selected VNFCI is capable of discovering other VNFCIs. The selected VNFCI is also capable of filtering and communicating data from the other VNFCIs and decided which information to pass to the VNFM. The selected VNFCI is further capable of receiving instructions from the VNFM to route to the other VNFCIs.

In this alternative embodiment, the operator's infrastructure is completely separate from the tenant's VNFs in that the operator's infrastructure is run on a separate network, which is inaccessible from the tenants. The VNFM communications with only one specialized virtual machine in the host, where the specialized virtual machine is part of the NFV operator infrastructure. The VNFM is capable of learning of the state of all of the VNFCIs that comprise the VNF and thus the VNFM is capable of making informed control decisions without interacting with a VNFCI. Furthermore, the VNFM is capable of acting on and providing instructions to all of the VNFCIs.

Figure 1:
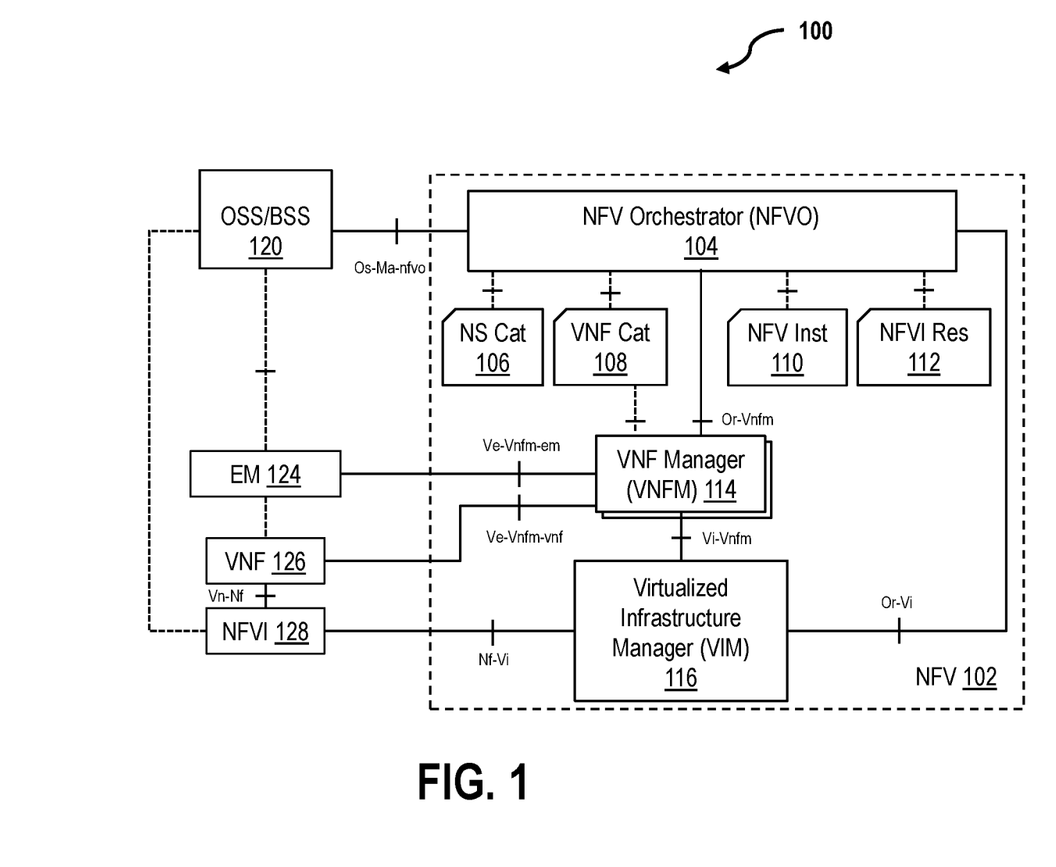
FIG. 1 is a schematic illustration of an exemplary computer network for an NFV architecture, in accordance with an embodiment.

FIG. 1 is a schematic illustration of an exemplary computer network 100 for an NFV architecture 102. NFV architecture 102 represents, for example, a system according to the ETSI NFV Management and Operations (MANO) specification, and includes an NFV orchestrator (NFVO) 104, an NS catalog 106, a virtual network functions (VNF) catalog 108, NFV instances 110, NFVI resources 112, a VNF manager (VNFM) 114, and a virtualized infrastructure manager (VIM) 116.

In an exemplary embodiment, network 100 includes an operations support systems/business support systems (OSS/BSS) functional block 120 for and in communication with the NFV architecture 102. The network 100 also includes element managers (EM) 124, virtual network functions 126, and network functions virtualization infrastructure (NFVI) 128.

The NFV orchestrator 104 orchestrates the NFVI resources across multiple VIMs 116 and manages the lifecycle of network services. The NS Catalogue 106 represents the repository of all on-boarded Network Services and supports the creation and management of the network services deployable templates. The VNF Catalogue 108 represents the repository of all of the on-boarded VNF packages and supports the creation and management of the VNF packages. The NFV Instances 110 repository holds information of all VNF instances 126 and network service instances. Each VNF instance 126 is represented by a VNF record and each ES instance is represented by an ES record. These records are updated during the lifecycle of respective instances. The NFVI Resources 112 repository holds information about available, reserved, and allocated NFVI resources as abstracted by the VIM 116 across the operator's Infrastructure Domains.

The VNFM 114 is responsible for the lifecycle management of VNF 126 instances. In some embodiments, the VNFM 114 is assigned the management of a single VNF 126 instance. In the exemplary embodiment, the VNFM 114 is assigned the management of a plurality of VNF 126 instances, of the same type or of different types. In some embodiments, the VNF Manager 114 functions are generic common functions applicable to any type of VNF 126. In other embodiments, some VNF 126 instances require specific functionality associated with their individual lifecycle. This functionality may be specified in the individual VNF's package.

In the exemplary embodiment, the VNFM 114 performs multiple functions for each VNF 126 associated with it. These functions may include, but are not limited to, VNF instantiation (including VNF configuration), VNF instantiation feasibility checking, VNF instance software updates and upgrades, VNF instance modification, VNF instance scaling, VNF instance-related collection of NFVI performance measurement results, VNF instance healing, VNF instance termination, VNF lifecycle management change notification, management of the integrity of the VNF instance throughout its lifecycle, and the overall coordination and adaption role for configuration and event reporting between the VIM 116 and the EM 124.

The VIM 116 is responsible for controlling NFVI 128 resources. The OSS/BSS 120 are a combination of the operator's other operations and business support functions that are not explicitly captures by the NFV 102. EM 124 is responsible for the FCAPS management functionality of a VNF 126. FCAPS stands for "Fault Management, Configuration Management, Accounting Management, Performance Management, and Security Management." EM 124 performs functions such as, but not limited to, configuration for the network functions provided by the VNF 126, fault management for the network functions provided by the VNF 126, accounting for the usage of the VNF functions, collecting performance measurement results for the functions provided by the VNF 126, and security management for the VNF functions. In some embodiments, the EM 124 collaborates with the VNFM 114 to perform those functions that require exchanges of information regarding the NFVI resources associated with the VNF 126. The NFVI 128 encompasses the hardware and software components that provided the infrastructure resources where VNFs 126 are deployed.

Figure 2:
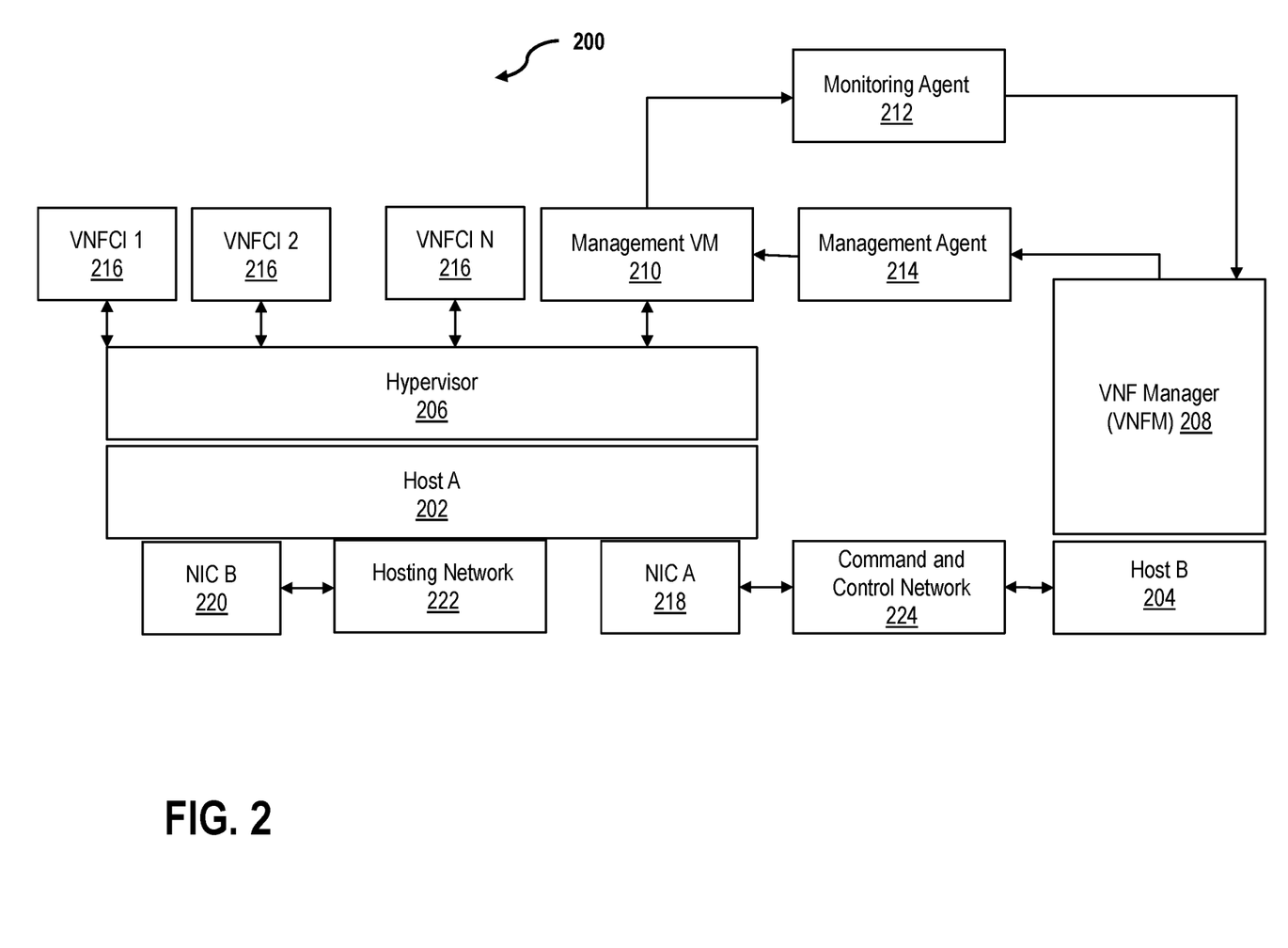
FIG. 2 is another schematic illustration of an alternative computer network for an enhance NFV architecture, in accordance with an embodiment.

FIG. 2 is another schematic illustration of an alternative computer network 200 for an enhance NFV architecture, in accordance with an embodiment.

In the exemplary embodiment, network 200 includes at least host A 202 and host B 204. In network 200, hypervisor 206 is executed by host A 202. In some embodiments, host A 202 is single computer device. In other embodiments, host A 202 represents a plurality of computer devices. In network 200, virtual network function manager (VNFM) 208 is executed by host B 204. In the exemplary embodiment, VNFM 208 is similar to VNFM 114 shown in FIG. 1. In some embodiments, host B 204 is single computer device. In other embodiments, host B 204 represents a plurality of computer devices.

In the exemplary embodiment, hypervisor 206 executes a management virtual machine (VM) 210 and a plurality of virtual network function component instantiations (VNFCI) 216. In the exemplary embodiment, VNFCI 216 is similar to VNF 126 shown in FIG. 1. Host A 202 contains the VNFCIs 26, each of which is a virtual machine. Management VM 210 includes a monitoring agent 212 and a management agent 214. In the exemplary embodiment, monitoring agent 212 and management agent 214 are each in one-way communication with VNFM 208, where monitoring agent 212 transmits messages to VNFM 208 and management agent 214 receives messages from VNFM 208. In other embodiments, the Management VM 210 is in direct two-way communication with the VNFM 208.

In the exemplary embodiment, host A 202 includes two separate network interface cards (NIC) 218 and 220. Each NIC 218 and 220 is associated with its own IP address. The NIC A 218 is connected to a Command and Control Network 224. The Command and Control Network 224 is only connected to management entities, such as the VNFM 208. The NIC B 220 is connected to the overall hosting network 222, for hosting the application infrastructure. The virtual NICs of all of the VNFCIs 216 are mapped onto NIC B 220. The NIC A 218 is used exclusively by the specialized management virtual machine (VM) 210. In some embodiments, the specialized Management VMs 210 have access to the hypervisor administrative application programmer's interface (API).

In the exemplary embodiment, the Management VM 210 runs the two processes: monitoring agent 212 and management agent 214. Both monitoring agent 212 and management agent 214 are considered interlocutors of the VNFM 208. The monitoring agent 212 collects information relevant to the execution of the VNFCIs 216 and transmits that information to the VNFM 208. In some embodiments, the monitoring agent 212 uses the hypervisor APIs to collect the information. In some embodiments, the monitoring agent 212 transmits the information in specific types of messages, such as notifications. In the exemplary embodiment, this information may be transmitted periodically or may be requested by the VNFM 208, such as through the management agent 214. In the exemplary embodiment, the management agent 214 receives messages, such as requests, from the VNFM 208 and executes those requests. In some embodiments, the management agent 214 executes the requests using the hypervisor API and the commands of the local operating system.

The VNFM 208 uses the information that it receives to make decisions. These decisions may be based on, but are not limited to, information accumulated from notifications from the monitoring agent 212, information received from other management entities, such as the NFV orchestrator 104 (shown in FIG. 1), information contained in the virtual network function description, and policy engines. In some embodiments, other sources of decision information may include: lawful interception administration and various administrative functions.

Based on the decisions made by the VNFM 208, the VNFM 208 generates requests and transmits them to the management agent 214 which then executes them. Examples of requests include, but are not limited to, VNF instantiation, VNF instance queries, VNF instance updates, VNF instance updates, VNF instance scaling, VNF instance termination, forwarding of configuration and events from the VNF 216 to the VNFM 208, forwarding of configuration and events about the VNF 216 from the VNFM 208 to the VNF 216, and verification that the VNF 216 is still alive or functional.

By having the Management VM 210 and its agents act as interlocutors for the VNFM 208, the VNFM 208 has no direct contact with the VNFs 216, and vice versa. Since the VNFM 208 is able to make its decisions based on communications through one set of communication channels, through the Management VM 210, rather than having channels to each of the VNFs 216, the communications are more efficient. This information collection and dissemination system provides the VNFM 208 will the information that it needs to assess and even predict the behavior of each VNF 216. And since the VNFM 208 and the interlocutor communicate over the separate Command and Control network 224, no VNFCI 216 needs either passive or active access to that network or the VNFM 208. This allows the network 200 to maintain the security principle that the hosted infrastructure and the management infrastructure be separate.

While the above network 200 in only an exemplary embodiment and arrangement of network components. Accordingly, different network configurations are capable of performing the methods and acting as the system described herein. The key point is that the infrastructure management entities are separated from the hosted infrastructure.

Figure 3:
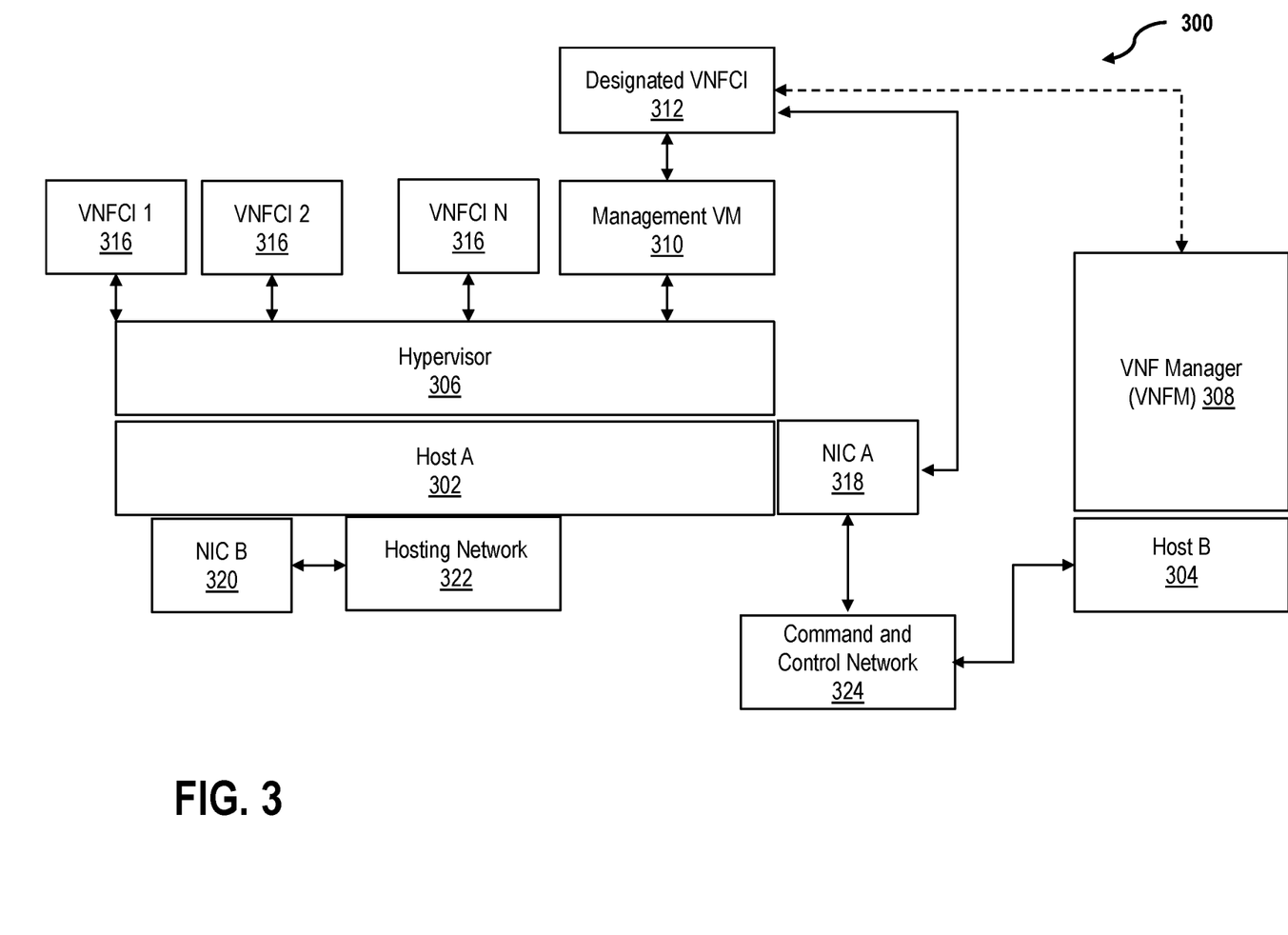
FIG. 3 is a further schematic illustration of another alternative computer network for an enhanced NFV architecture, in accordance with an embodiment.

FIG. 3 is a further schematic illustration of another alternative computer network 300 for an enhanced NFV architecture, in accordance with an embodiment.

In the exemplary embodiment, network 300 includes at least host A 302 and host B 304. In network 300, hypervisor 306 is executed by host A 302. In some embodiments, host A 302 is single computer device. In other embodiments, host A 302 represents a plurality of computer devices. In network 300, virtual network function manager (VNFM) 308 is executed by host B 304. In the exemplary embodiment, VNFM 308 is similar to VNFM 114 shown in FIG. 1. In some embodiments, host B 304 is single computer device. In other embodiments, host B 304 represents a plurality of computer devices.

In the exemplary embodiment, hypervisor 306 executes a management virtual machine (VM) 310 and a plurality of virtual network function component instantiations (VNFCI) 316. In the exemplary embodiment, VNFCI 316 is similar to VNF 126 shown in FIG. 1. Host A 302 contains the VNFCIs 316, each of which is a virtual machine. Management VM 310 is in communication with a designated VNFCI 312, which may be similar to VNF 126 shown in FIG. 1. The designated VNFCI 213 provides the interface between the VNFM 308 and the Management VM 310 and the plurality of VNFCIs 316 hosted on Host A 302. In some embodiments, the designated VNFCI 312 is in direct communication with the VNFM 308. In other embodiments, the designated VNFCI 312 through a Command and Control Network 324 executed by host B 304.

In the exemplary embodiment, host A 302 includes two separate network interface cards (NIC) 318 and 320. Each NIC 318 and 320 is associated with its own IP address. The NIC A 318 is connected to a Command and Control Network 324. The Command and Control Network 324 is only connected to management entities, such as the VNFM 308. The NIC B 320 is connected to the overall hosting network 322, for hosting the application infrastructure. The virtual NICs of all of the non-designated VNFCIs 316 are mapped onto NIC B 320. The NIC A 318 is used exclusively by the specialized management virtual machine (VM) 310. In some embodiments, the specialized Management VMs 310 have access to the hypervisor administrative application programmer's interface (API).

In the exemplary embodiment, the Management VM 310 runs the designated VNFCI 312. The Management VM 310 is already configured control all of the input/output devices. Therefore, security concerns allow the Management VM 310 to be an optimized location for providing a secure interface. As the Management VM 310 is the primary interface between the VNFCI 316 and the VNFM 308, the hypervisor 306 can dedicate resources to inspecting the Management VM 310 and the VNFCI processes. This allows the hypervisor 306 to develop and maintain security controls for the network 300. Only having to secure a single machine, the Management VM 310, instead of securing many machines, provides a more efficient use of resources while still providing security to the network 3000. The single point of interface allows for enabling this interface on an ordinary virtual machine with violating a major security principle of virtualization management, namely that the management infrastructure should have no open communications with the managed infrastructure.

In the embodiments, shown in FIG. 3, the network 300 does not need to route communications between the VNFCI 216 and the VNFM 208 through the monitoring agent 212 and management agent 214 (both shown in FIG. 2). However, network 300 can include and coexist with the agents 212 and 214. More specifically, the interface between the VNFM 114 process and a process on each virtual machine that implements a VNFCI 316 needs to provide a secure connection between these networks 322 and 324. The designated VNFCI 312 collects information relevant to the execution of the VNFCIs 316 and transmits that information to the VNFM 308. In some embodiments, the designated VNFCI 312 uses the hypervisor APIs to collect the information. In some embodiments, the information is collected by the Management VM 310. In some embodiments, the designated VNFCI 312 filters the collected data prior to transmitting. For example, the designated VNFCI 312 may determine which information is important to the VNFM 308 and places the filtered information in specific types of messages, such as notifications. In the exemplary embodiment, this information may be transmitted periodically or may be requested by the VNFM 308. In the exemplary embodiment, the designated VNFCI 312 receives messages, such as requests, from the VNFM 308 and executes those requests. In some embodiments, the designated VNFCI 312 executes the requests using the hypervisor API and the commands of the local operating system.

The VNFM 308 uses the information that it receives to make decisions. These decisions may be based on, but are not limited to, information accumulated from notifications from the designated VNFCI 312, information received from other management entities, such as the NFV orchestrator 104 (shown in FIG. 1), information contained in the virtual network function description, and policy engines. In some embodiments, other sources of decision information may include: lawful interception administration and various administrative functions.

Based on the decisions made by the VNFM 308, the VNFM 308 generates requests and transmits them to the designated VNFCI 312 which then executes them. Examples of requests include, but are not limited to, VNF instantiation, VNF instance queries, VNF instance updates, VNF instance updates, VNF instance scaling, VNF instance termination, forwarding of configuration and events from the VNFCI 316 to the VNFM 308, forwarding of configuration and events about the VNFCI 316 from the VNFM 308 to the VNFCI 316, and verification that the VNFCI 316 is still alive or functional.

By having the Management VM 310 and the designated VNFCI 312 act as interlocutors for the VNFM 308, the VNFM 308 has no direct contact with the VNFCIs 316, and vice versa. Since the VNFM 308 is able to make its decisions based on communications through one set of communication channels, through the Management VM 310 and the designated VNFCI 312, rather than having channels to each of the VNFCIs 316, the communications are more efficient. This information collection and dissemination system provides the VNFM 308 will the information that it needs to assess and even predict the behavior of each VNFCI 316. And since the VNFM 308 and the interlocutor communicate over the separate Command and Control network 324, no VNFCI 316 needs either passive or active access to that network or the VNFM 308. This allows the network 200 to maintain the security principle that the hosted infrastructure and the management infrastructure be separate.

In some embodiments, the designated VNFCI 312 is chosen from the plurality of VNFCIs 316. This selection may be made when the network 300 is being set-up. A specific VNFCI 312 may be set-up and/or configured to act as the designated VNFCI 312. In other embodiments, the Management VM 310 may select which VNFCI 316 to use based on historical information from previous instantiations of a network 300 or preferences made by one or more users, such as the host administrator.

While the above network 300 in only an exemplary embodiment and arrangement of network components. Accordingly, different network configurations are capable of performing the methods and acting as the system described herein. The key point is that the infrastructure management entities are separated from the hosted infrastructure.

Figure 4:
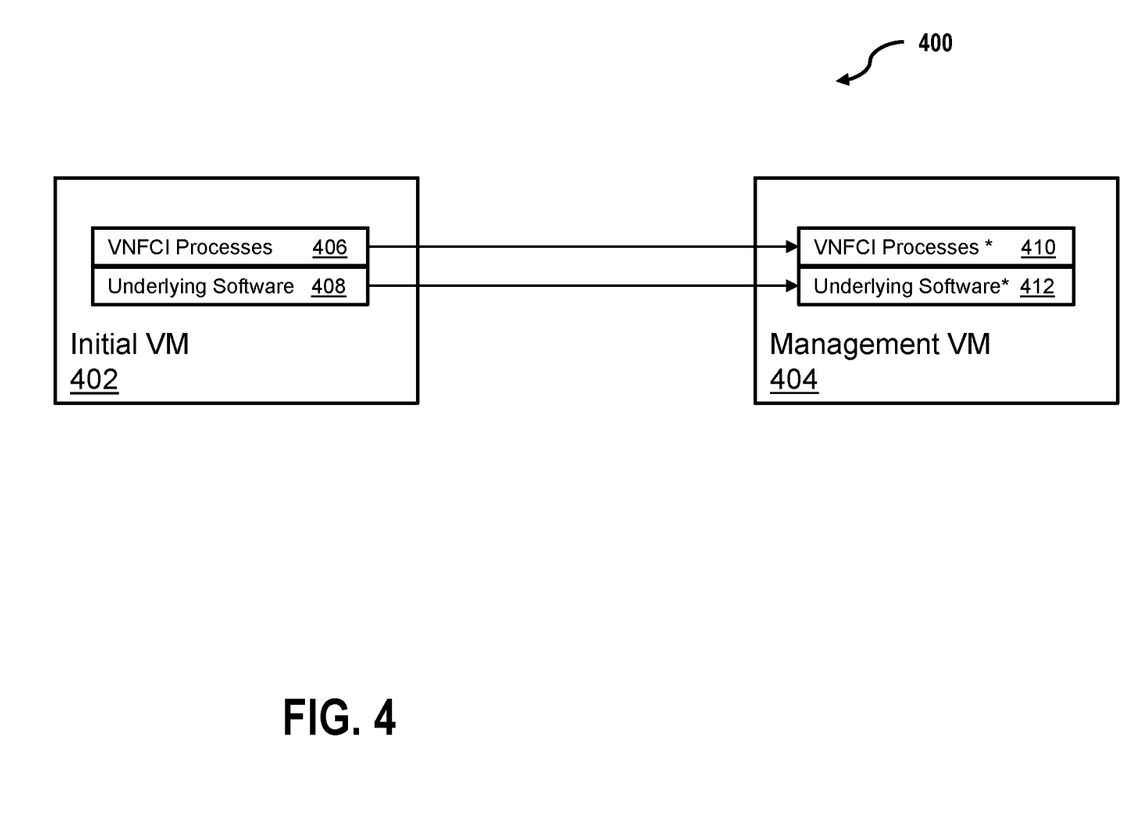
FIG. 4 is a dataflow diagram illustrating a process for migrating a designated VNFCI using the enhanced NFV architecture shown in FIG. 3, in accordance with an embodiment.

FIG. 4 is a dataflow diagram illustrating a process 400 for migrating a designated VNFCI 312 using the enhanced NFV architecture 300 (both shown in FIG. 3), in accordance with an embodiment.

The designated VNFCI 312 is chosen from the plurality of VNFCIs 316. The designated VNFCI 312 is aware of all of the other VNFCIs 316, which the designated VNFCI 312 needs to be in communication with. To this end, the software associated with designated VNFCI 312 needs to be capable of discovering other VNFCIs 316 on the hosting network 322 (shown in FIG. 3). Furthermore, the designated VNFCI 316 needs to be capable of determining the criteria for filtering and accumulating data generated by the VNFCIs 316. The designated VNFCI 312 also needs to be able to choose which data to pass to the VNFM 308 (shown in FIG. 3).

When the designated VNFCI 312 has been selected, the VNFM 308 or MANO is notified to trigger the migration process 400 to transition the designated VNFCI 312 from the initial VM 402, such as that hosting the selected VNFCI 316, to the Management VM 404, which may be similar to Management VM 310 (shown in FIG. 3). The migration process 400 can be performed manually, such as by a host administrator, or by software.

In the exemplary embodiment, the underlying software 408 of the VNFCI processes 406 that are not available to the Management VM 404 are installed in the Management VM 404. This may include where the operating systems of the initial VM 402 and the management VM 310 differ. In this situation, the underlying software 408 may include extra translation and recompilation steps. Once underlying software* 412 has been installed on the Management VM 404, the VNFCI processes 406 are relocated to the Management VM 404. In some embodiments, this transition may require additional translation and recompilation steps if the operating systems of the two VMs differ.

The initial VNFCI 316 that was selected to be the designated VNFCI 312 is shut down, now that its processes have been transferred to the Management VM 404. The security permissions of the newly installed VNFCI processes* 410 are updated. From this point forward, the VNFCI processes* 410 are in communication with the rest of the VNFCIs 316 via the hosting network 312 (shown in FIG. 3). The VNFCI processes* 410 are now in communication with the VNFM 308 via the Command and Control Network 324. In the exemplary embodiment, all communications between the designated VNFCI 312 and the VNFM 308 are monitored by the hypervisor 306 (shown in FIG. 3).

According to the several embodiments described herein, separate management infrastructure and hosted infrastructure in an NFV environment may be centrally implemented in a variety of different technological environments, and without requiring any structural (i.e., hardware) changes to the computer networks of such technological environments. The present embodiments therefore provide significant advantages over computer network environments with combined or intertwined infrastructures.

Exemplary embodiments of systems and methods for separate management infrastructure and hosted infrastructure in an NFV environment are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings. For example, the following list of example claims represents only some of the potential combinations of elements possible from the systems and methods described herein.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

The improvements described herein may be achieved by performing one or more of the following steps: (a) execute a management virtual machine for communicating with a remote host computing device over a first computer network; (b) execute a plurality of virtual network function component instantiations; (c) receive status information about a first virtual network function component instantiation of the plurality of virtual network function component instantiations; (d) transmit the status information to the remote host computing device via the first computing network; (e) receive a request from the remote host computing device via the first computing network; (f) execute the request one the first virtual network function component instantiation; (g) communicate with a second virtual network function component instantiation via a second computer network, where the first computer network and the second computer network are separate; (h) communicate over the first network via the first network interface card; (i) communicate over the second network via the second network interface card; (j) execute a hypervisor for controlling the plurality of virtual network function component instantiations; (k) terminate the first virtual network function component instantiation based on the received request; (l) execute a first agent for transmitting messages to the remote host computing device; and (m) execute a second agent for receiving messages from the remote host computing device.

In other embodiments, the improvements described herein may be achieved by performing one or more of the following steps: (a) executing a designated virtual network function component instantiation for communicating with a remote host computing device over a first computer network; (b) executing a plurality of virtual network function component instantiations; (c) receiving status information about a first virtual network function component instantiation of the plurality of virtual network function component instantiations; (d) transmitting the status information to the remote host computing device via the first computing network; (e) receiving a request from the remote host computing device via the first computing network; (f) executing the request one the first virtual network function component instantiation; (g) communicating with a second virtual network function component instantiation via a second computer network, where the first computer network and the second computer network are separate; (h) communicating over the first computer network via the first network interface card, where the at least one processor is in communication with a first network interface card and a second network interface card; (i) communicating over the second computer network via the second network interface card; (j) executing a hypervisor for controlling the plurality of virtual network function component instantiations; (k) monitoring, via the hypervisor, communications between the designated virtual network function component instantiation and the plurality of virtual network function component instantiations; (l) terminating the first virtual network function component instantiation based on the received request; (m) transmitting messages to the remote host computing device via the designated virtual network function component instantiation; and (n) receiving messages from the remote host computing device via the designated virtual network function component instantiation.

The aspects described herein may be implemented as part of one or more computer components such as a client device and/or one or more back-end components, such as a host device, for example. Furthermore, the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

For instance, aspects include routing communications between separate networks to ensure security and limiting communication channels to improve efficiency. In doing so, the aspects overcome issues associated with having compromised devices infect other devices and ensuring proper communications between a VNFM and a VNFCI. Furthermore, these aspects reduce the chance of data compromise and allow for proper access to the communications. Without the improvements suggested herein, additional processing and memory usage, or even direct human intervention, would be required to perform such activities. Additional technical advantages include, but are not limited to: i) improved speed and responsiveness in communication with a connected device; ii) improved security of virtual network function managers; iii) allowing the virtual network function manager to control more VNFCIs; iv) reducing the chance of malicious communications; v) allowing for protected two-way communication; and vi) preventing the VNFCIs from having direct access to their managers. Additional technical advantages are described in other sections of the specification.

Furthermore, the embodiments described herein improve upon existing technologies, and improve the functionality of computers, by more accurately predict or identify the current security status of any connected device. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of virtual network functions, which have been historically associated with a poor record of securing communications and data. The present embodiments enable more reliable updating and control of such functions, but without compromising data and communications. Furthermore, according to the disclosed techniques, the monitoring and updating of virtual network functions in greatly improved to improve the security of these functions, the associated computer devices, and the associated computer networks.

Exemplary embodiments of systems and methods for separating infrastructure management entities from the hosted infrastructure are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A host computing device comprising at least one processor in communication with at least one memory device including instructions that when executed by the at least one processor cause the host computing device to:
execute a designated virtual network function component instantiation for communicating with a remote host computing device over a first communication network;
execute one or more isolated virtual network function component instantiations, wherein the one or more isolated virtual network function component instantiations are prevented from directly communicating with the remote host computer device;
receive data from the one or more isolated virtual network function component instantiations;
filter the data from the one or more isolated virtual network function component instantiations; and accumulate the filtered data to transmit to the remote host computing device.

2. The host computing device of claim 1, wherein the designated virtual network function component instantiation is separate from the one or more isolated virtual network function component instantiations.

3. The host computing device of claim 1, wherein the instructions further cause the host computing device to:
receive, by the designated virtual network function component instantiation, status information about a first virtual network function component instantiation of the one or more isolated virtual network function component instantiations; and
transmit, from the designated virtual network function component instantiation, the status information to the remote host computing device via the first computing network.

4. The host computing device of claim 1, wherein the instructions further cause the host computing device to:
receive, by the designated virtual network function component instantiation, a request from the remote host computing device via the first computing network; and
execute the request on a first virtual network function component instantiation of the one or more isolated virtual network function component instantiations.

5. The host computing device of claim 1, wherein the instructions further cause the host computing device to communicate with a second virtual network function component instantiation via a second communication network, where the first communication network and the second communication network are separate.

6. The host computing device of claim 1, wherein the instructions further cause the host computing device to:
transmit messages to the remote host computing device via the designated virtual network function component instantiation; and
receive messages from the remote host computing device via the designated virtual network function component instantiation.

7. The host computing device of claim 1, wherein the first communication network is a Command and Control Network, and wherein the host computing device is connected to the remote host computing device via the Command and Control Network.

8. The host computing device of claim 1, wherein the host computing device is connected to a host network, wherein the host network is connected to the one or more isolated virtual network function component instantiations, and wherein the remote host computing device isolated from the host network.

9. The host computing device of claim 8, wherein the host computing device further comprises a first network interface card and a second network interface card, wherein the first network interface card connects the host computing device to the first communication network and the second network interface card connects the host computing device to the host network.

10. The host computing device of claim 1, wherein the instructions further cause the host computing device to execute a management virtual machine which executes the designated virtual network function component instantiation.

11. The host computing device of claim 10, wherein the designated virtual network function component instantiation is selected from the one or more isolated virtual network function component instantiations and wherein the selected virtual network function component instantiation is transferred from a virtual machine executing the selected virtual network function component instantiation to the management virtual machine.

12. The host computing device of claim 11, wherein the selected virtual network function component instantiation is shut down when the designated virtual network function component instantiation begins to execute on the management virtual machine.

13. The host computing device of claim 1, wherein the instructions further cause the host computing device to execute a hypervisor in communication with the designated virtual network function component instantiation and the one or more isolated virtual network function component instantiations.

14. The host computing device of claim 13, wherein the hypervisor monitors communications between the designated virtual network function component instantiation and the one or more isolated virtual network function component instantiations.

15. The host computing device of claim 1, wherein the designated virtual network function component instantiation is programmed to route messages between the one or more isolated virtual network function component instantiations and the remote host computing device.

16. A method for providing virtual network functions implemented by a host computing device comprising at least one processor in communication with at least one memory device, the method comprising:
executing a designated virtual network function component instantiation for communicating with a remote host computing device over a first communication network;
executing a one or more isolated virtual network function component instantiations, wherein the one or more isolated virtual network function component instantiations are prevented from communicating directly with the remote host computing device;
receiving data from the one or more isolated virtual network function component instantiations;
filtering the data from the one or more isolated virtual network function component instantiations; and
accumulating the filtered data to transmit to the remote host computing device.

17. The method of claim 16 further comprising:
receiving, by the designated virtual network function component instantiation, status information about a first virtual network function component instantiation of the one or more isolated virtual network function component instantiations; and
transmitting, from the designated virtual network function component instantiation, the status information to the remote host computing device via the first computing network.

18. The method of claim 16 further comprising:
receiving, via the designated virtual network function component instantiation, a request from the remote host computing device via the first computing network; and
executing the request on the designated virtual network function component instantiation.

19. The method of claim 16 further comprising communicating with a second virtual network function component instantiation via a second communication network, where the first communication network and the second communication network are separate.

20. The method of claim 16, wherein the host computing device further comprises a first network interface card and a second network interface card, wherein the host computing device is connected to a host network, wherein the host network is connected to the one or more isolated virtual network function component instantiations, wherein the remote host computing device isolated from the host network, and wherein the first network interface card connects the host computing device to the first communication network and the second network interface card connects the host computing device to the host network.

* * * * *

UNITED STATES PATENT AND TRADEMARK OFFICE
CERTIFICATE OF CORRECTION

PATENT NO. : 12,301,455 B2
APPLICATION NO. : 18/512563
DATED : May 13, 2025
INVENTOR(S) : Steven J. Goeringer, Igor Faynberg and Donald E. A. Clarke It is certified that error appears in the above-identified patent and that said Letters Patent is hereby corrected as shown below:

On the Title Page

In item (73), in Assignee, delete "Cable Television Laboratory, Inc. Louisville, CO (US)" and insert therefor -- Cable Television Laboratories, Inc., Louisville, CO (US) --

Signed and Sealed this
Eleventh Day of November, 2025

John A. Squires
*Director of the United States Patent and Trademark Office*